US011209327B2

(12) United States Patent
Sun et al.

(10) Patent No.: US 11,209,327 B2
(45) Date of Patent: Dec. 28, 2021

(54) CLOSED LOOP CONTROL METHOD FOR TRANSVERSE LOAD AMPLITUDE OF MULTIPLE BOLT LOOSING TESTER

(71) Applicant: Dalian University of Technology, Dalian (CN)

(72) Inventors: Qingchao Sun, Dalian (CN); Qingyuan Lin, Dalian (CN); Bao Zhang, Dalian (CN); Bin Yang, Dalian (CN); Xiaokai Mu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 299 days.

(21) Appl. No.: 16/603,979

(22) PCT Filed: Jul. 17, 2018

(86) PCT No.: PCT/CN2018/095875
§ 371 (c)(1),
(2) Date: Oct. 9, 2019

(87) PCT Pub. No.: WO2020/014852
PCT Pub. Date: Jan. 23, 2020

(65) Prior Publication Data
US 2020/0309624 A1 Oct. 1, 2020

(51) Int. Cl.
*G01L 5/00* (2006.01)
*G01M 13/00* (2019.01)
*G05D 17/02* (2006.01)

(52) U.S. Cl.
CPC .............. *G01L 5/00* (2013.01); *G01M 13/00* (2013.01); *G05D 17/02* (2013.01)

(58) Field of Classification Search
CPC ........ G01L 5/00; G01L 5/0028; G01M 13/00; G05D 17/02
See application file for complete search history.

(56) References Cited

U.S. PATENT DOCUMENTS 10,598,567 B1 * 3/2020 Sun ....................... G01M 13/02
10,620,069 B2 * 4/2020 Sun ........................... G01L 5/24
(Continued)

FOREIGN PATENT DOCUMENTS

CN 103149023 A 6/2013
CN 107505124 A 12/2017
(Continued)

*Primary Examiner* — Freddie Kirkland, III
(74) *Attorney, Agent, or Firm* — Muncy, Geissler, Olds and Lowe, P.C.

(57) ABSTRACT

The present invention belongs to the technical field of multiple bolt transverse load loosing testers, and relates to a closed loop control method for transverse load amplitude of multiple bolt loosing tester. The closed loop control method is used to conduct stepless amplitude modulation and accurate control for transverse loads of a multiple bolt loosing tester, thereby realizing stepless amplitude modulation and accurate control for the transverse loads. The closed loop control method is realized based on the multiple bolt loosing tester. The multiple bolt loosing tester consists of four parts: a transverse load amplitude control part, a transverse load transmission part, a torque load transmission part and an axial load transmission part. The present invention can provide stepless amplitude modulation continuous transverse loads for a flange bolt set and guarantee the accuracy of the transverse loads through a closed loop control system.

1 Claim, 1 Drawing Sheet

(56) References Cited

U.S. PATENT DOCUMENTS

| | | | |
|---|---|---|---|
| 10,746,642 B2* | 8/2020 | Sun | G05B 19/0405 |
| 10,768,071 B2* | 9/2020 | Sun | G01M 5/005 |
| 11,073,455 B2* | 7/2021 | Sun | G01M 7/06 |
| 2019/0242779 A1* | 8/2019 | Sun | G01M 5/005 |
| 2020/0018673 A1* | 1/2020 | Sun | G01M 13/00 |

FOREIGN PATENT DOCUMENTS

| | | |
|---|---|---|
| CN | 107621361 A | 1/2018 |
| JP | 2005003658 A | 1/2005 |
| JP | 5910971 B2 | 4/2016 |

* cited by examiner

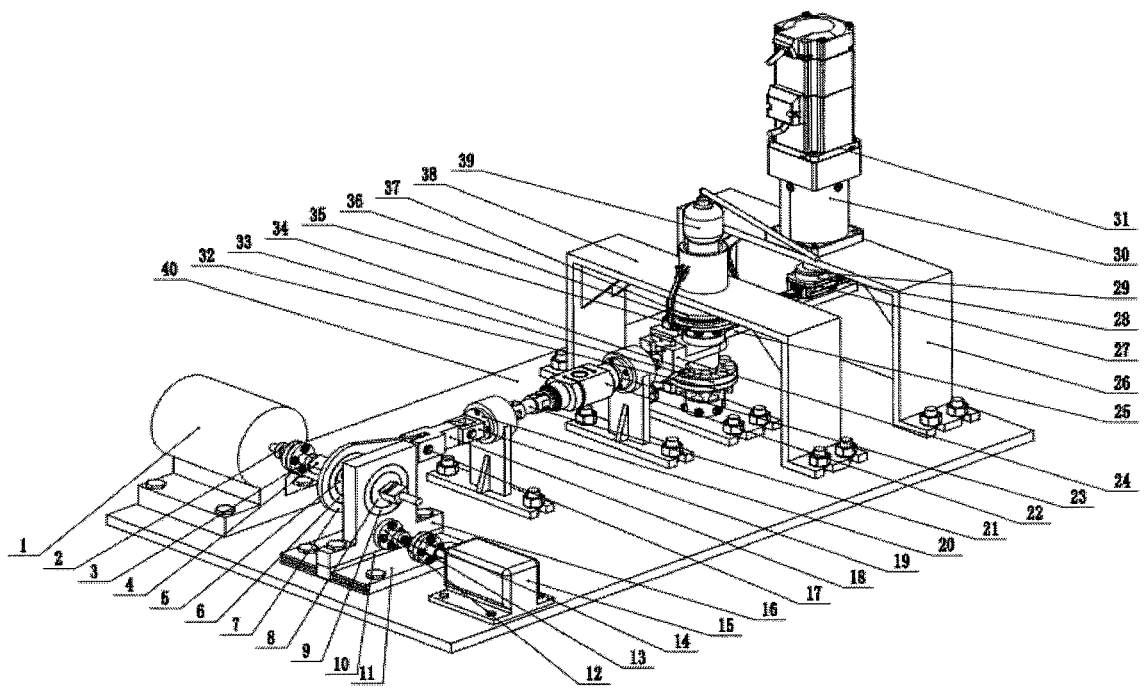

CLOSED LOOP CONTROL METHOD FOR TRANSVERSE LOAD AMPLITUDE OF MULTIPLE BOLT LOOSING TESTER

TECHNICAL FIELD

The present invention belongs to the technical field of multiple bolt transverse load loosing testers, and relates to a closed loop control method for transverse load amplitude of multiple bolt loosing tester.

BACKGROUND

Bolt loosing is one of the main failure modes of bolted connection structures. A bolt loosing tester can be used to study the loosing of the bolt under different working conditions. The existing bolt loosing testers can be classified into single bolt loosing testers and multiple bolt loosing testers. The single bolt loosing tester mainly includes a Junker loosing tester, a NAS loosing tester and an electro-hydraulic servo vibration tester. The above three single bolt loosing testers cannot test the loosing of a bolt set, and the load that can be applied is relatively simple, and is difficult to simulate real working conditions. However, the current multiple bolt loosing testers provide transverse loads which are fixed loads mainly. Even the size of a part can be changed to obtain different loads, the transverse loads are difficult to be accurately controlled due to the existence of manufacturing and assembly errors. Moreover, adjustment of the transverse loads is high in cost and long in cycle. The real working conditions of the bolt set are difficult to be accurately and effectively simulated.

Therefore, the closed loop control method for transverse load amplitude of multiple bolt loosing tester is designed to provide amplitude stepless modulation continuous transverse loads for a flange bolt set and accurately control the transverse load values by a feedback system, so as to more accurately simulate the loosing of a flange under working conditions. At present, there is no relevant patent in the multiple bolt loosing tester.

SUMMARY

The purpose of the present invention is to provide a closed loop control method for transverse load amplitude of multiple bolt loosing tester, which can conduct continuous stepless amplitude modulation for transverse loads supported by a multiple bolt connecting flange and guarantee the accuracy of the transverse loads through a feedback control system.

The technical solution of the present invention is:

A closed loop control method for transverse load amplitude of multiple bolt loosing tester is provided. The closed loop control method is used to conduct stepless amplitude modulation and accurate control for transverse loads of a multiple bolt loosing tester, analyzing a signal collected by a sensor, then conducting calculation through a PLC control system and finally issuing an instruction to a motor control system for controlling the rotation of the motor, thereby realizing stepless amplitude modulation and accurate control for the transverse loads.

The closed loop control method is realized based on the multiple bolt loosing tester; the multiple bolt loosing tester consists of four parts: a transverse load amplitude control part, a transverse load transmission part, a torque load transmission part and an axial load transmission part.

The torque load transmission part comprises a torque arm 25, a speed reducer support frame 26, a guide rail sliding block 27, a bearing outer sleeve 28, a torque eccentric coupling 29, a speed reducer 30 and a torque servo motor 31; the speed reducer support frame 26 is fixed to a bottom plate 40; the torque servo motor 31 is externally connected with the speed reducer 30; an output shaft of the speed reducer 30 penetrates through the speed reducer support frame 26 and is fixed to the speed reducer support frame 26; the output shaft of the speed reducer 30 is connected with the torque eccentric coupling 29; the torque eccentric coupling 29 is fixed together with the upper end surface of the bearing sleeve 28; the lower end surface of the bearing sleeve 28 is fixed to a sliding block of the guide rail sliding block 27; a guide rail of the guide rail sliding block 27 is fixed to the torque aim 25; and one end of the torque arm 25 provided with a hexagon socket head is sleeved above a tensile plate 24 on an outer hexagon of a thick plank 33.

The axial load transmission part comprises a thin plank 32, the thick plank 33, a specimen bolt 34, a bearing cap 35, a thrust ball bearing 36, an upper clamping plate 37, an axial load support frame 38 and a hydraulic rama 39; ends of the thin plank 32 and the thick plank 33 are correspondingly assembled together; the upper end of the thick plank 33 and a right circular hole of the tensile plate 24 are assembled together, and the tail end of the thick plank 33 is installed in an inner ring of the upper clamping plate 37; the bearing cap 35 penetrates through the upper clamping plate 37, and clamps the thrust ball bearing 36 between the bearing cap 35 and the upper clamping plate 37; and one end of an oil hydraulic starting lever of the hydraulic rama 39 is placed in a cylinder on the axial load support frame 38, and a grappling hook on the oil hydraulic starting lever grapples the edge of the bearing cap 35.

The transverse load amplitude control part comprises a second square shaft bushing 8, a square shaft bearing 9, a transverse load guide rail moving plate 10, a transverse load guide rail fixed base plate 11, a lead screw nut 12, a ballscrew 13, a servo motor coupling 14, a servo motor 15 and a T-shaped sliding block 16; the second square shaft bushing 8 is connected with the square shaft bearing 9; the square shaft bearing 9 is installed in the T-shaped sliding block 16 through interference fit; the T-shaped sliding block 16 is installed on the transverse load guide rail moving plate 10, and moves together with the transverse load guide rail moving plate 10; the transverse load guide rail moving plate 10 can slide on the transverse load guide rail fixed base plate 11, and the transverse load guide rail fixed base plate 11 is installed on the bottom plate 40; the T-shaped sliding block 16 is connected with the lead screw nut 12, and the lead screw nut 12 is matched with the ballscrew 13 and located below the square shaft bearing 9; and the ballscrew 13 is connected with the servo motor 15 through the servo motor coupling 14, and the servo motor 15 is fixed to the bottom plate 40.

The transverse load transmission part comprises a spindle motor 1, a spindle motor output shaft flange 2, a square shaft flange 3, a square shaft 4, a first square shaft bushing 5, a crankshaft bearing 6, an eccentric rocker 7, a rocker connecting pin 17, a rocker connecting block 18, a U-shaped connecting rod 19, a first straight bearing 20, an elastic rod 21, a force sensor 22, a second straight bearing 23, a tensile plate 24 and a bottom plate 40; the spindle motor 1 is fixed to the bottom plate 40; an output shaft of the spindle motor 1 is connected with the square shaft 4 through the spindle motor output shaft flange 2 and the square shaft flange 3; the square shaft 4 drives the crankshaft bearing 6 through the first square shaft bushing 5 to rotate; the crankshaft bearing 6 transmits the motion to the eccentric rocker 7, and the eccentric rocker 7 is connected with the rocker connecting block 18 through the rocker connecting pin 17; the U-shaped connecting rod 19 is fixed to the rocker connecting block 18, and penetrates through the first straight bearing 20 to connect with the elastic rod 21; the elastic rod 21 is connected with the force sensor 22; and a transverse load is transmitted to the tensile plate 24 through the second straight bearing 23.

A stepless amplitude modulation and accurate control method for transverse loads based on a multiple bolt loosing tester comprises the following steps:

step a) reading in various test parameters inputted by a user, comprising thickness d of connected pieces, lubrication condition m among the connected pieces, number n of bolts, target transverse load amplitude $F_0$ and allowable error value e, wherein $m_1$ represents no lubrication, $m_2$ represents certain degree of lubrication and $m_3$ represents good lubrication;

step b) automatically substituting the test parameters in step a) into a correction function K=g(d,m,n) by the system, calculating a correction coefficient K, and then automatically substituting the target transverse load amplitude $F_0$ and the correction coefficient K into a load function F=f(x,K) and calculating a target position point $x_0$ of the T-shaped sliding block 16, wherein x represents a position point of the T-shaped sliding block 16, and the correction function and the load function are stored in a tester controller;

step c) starting the servo motor 15, driving the T-shaped sliding block 16 by the ballscrew 13 through the lead screw nut 12 to move on the transverse load guide rail fixed base plate 11 together with the transverse load guide rail moving plate 10, and regulating the T-shaped sliding block 16 to the target position point $x_0$ to obtain an actual transverse load amplitude F close to the target transverse load amplitude $F_0$;

step d) enabling the spindle motor 1 to operate, and simultaneously enabling the force sensor 22 to monitor the size of the actual transverse load amplitude F in real time;

step e) calculating a difference $\Delta_1=F-F_0$ between the actual transverse load amplitude F and the target transverse load amplitude $F_0$, comparing a size relationship between a difference absolute value $|\Delta_1|$ and the allowable error value e, directly entering step f) if $|\Delta|\le e$, calculating an update transverse load amplitude $$F_1 = F_0 - \Delta_1 \cdot \frac{F_0}{F}$$

if $|\Delta_1|>e$, substituting a calculation result into the load function F=f (x, K), calculating an update position point $x_1$ starting the servo motor 15, rapidly finely adjusting the T-shaped sliding block 16 to the update position point $x_1$, then comparing the difference between the actual transverse load amplitude F and the target transverse load amplitude $F_0$ again, and repeating the above process until the difference between the actual transverse load amplitude F and the target transverse load amplitude $F_0$ is less than the allowable error value e, wherein a smaller allowable error value e indicates better load stability and accuracy, but too small allowable error value e may result in longer regulating time;

step f) continuously monitoring the size of the actual transverse load amplitude F and repeating the step e) after the actual transverse load amplitude F meets the requirement, i.e., the difference between the actual transverse load amplitude F and the target transverse load amplitude $F_0$ is less than the allowable error value e, due to the instability of the transverse load amplitude;

step g) taking the update transverse load amplitude $F_1$ as a new target transverse load amplitude, and conducting step a) to step g) when the user inputs a new target transverse load amplitude $F_1$ and a new allowable error value e.

The present invention has the beneficial effects: the closed loop control method for transverse load amplitude based on the multiple bolt loosing tester provided by the present invention can provide stepless amplitude modulation continuous transverse loads for a flange bolt set and guarantee the accuracy of the transverse loads through a closed loop control system.

DESCRIPTION OF DRAWINGS

The FIGURE is a trimetric drawing of a tester.

In the FIGURES: 1 spindle motor; 2 spindle motor output shaft flange; 3 square shaft flange; 4 square shaft;

5 first square shaft bushing; 6 crankshaft bearing; 7 eccentric rocker; 8 second square shaft bushing; 9 square shaft bearing;

10 transverse load guide rail moving plate; 11 transverse load guide rail fixed base plate; 12 lead screw nut; 13 ballscrew;

14 servo motor coupling; 15 servo motor; 16 T-shaped sliding block; 17 rocker connecting pin;

18 rocker connecting block; 19 U-shaped connecting rod; 20 first straight bearing; 21 elastic rod; 22 force sensor;

23 second straight bearing; 24 tensile plate; 25 torque atm; 26 speed reducer support frame; 27 guide rail sliding block;

28 bearing outer sleeve; 29 torque eccentric coupling; 30 speed reducer; 31 torque servo motor;

32 thin plank; 33 thick plank; 34 specimen bolt; 35 bearing cap; 36 thrust ball bearing;

37 upper clamping plate; 38 axial load support frame; 39 hydraulic rama; and 40 bottom plate.

DETAILED DESCRIPTION

Specific embodiment of the present invention is further described below in combination with accompanying drawings and the technical solution.

The structure of the tester is shown in the figure:

1. Closed Loop Control Method for Transverse Load Amplitude (1) reading in various test parameters inputted by a user, comprising thickness d of connected pieces, lubrication condition m among the connected pieces, number n of bolts, target transverse load amplitude $F_0$ and allowable error value e, wherein $m_1$ represents no lubrication, $m_2$ represents certain degree of lubrication and $m_3$ represents good lubrication.

(2) Automatically substituting the above parameters into a correction function K=g(d, m, n) by the system, calculating a correction coefficient K, and then automatically substituting the target transverse load amplitude $F_0$ and the correction coefficient K into a load function F=f(x, K) and calculating a target position point $x_0$ of the T-shaped sliding block 16, wherein the correction function and the load function are stored in a tester controller.

(3) Starting the servo motor 15, driving the T-shaped sliding block 16 by the ballscrew 13 through the lead screw nut 12 to move on the transverse load guide rail fixed base plate 11 together with the transverse load guide rail moving plate 10, and regulating the T-shaped sliding block 16 to the target position point $x_0$ to obtain an actual transverse load amplitude F close to the target transverse load amplitude $F_0$ (4) Enabling the spindle motor 1 to operate, and simultaneously enabling the force sensor 22 to monitor the size of the actual transverse load amplitude F in real time;

(5) Calculating a difference $\Delta_1 = F - F_0$ between the actual transverse load amplitude F and the target transverse load amplitude $F_0$, comparing a size relationship between a difference absolute value $|\Delta_1|$ and the allowable error value e, directly entering step (6) if $|\Delta_1| \le e$, calculating an update transverse load amplitude $$F_1 = F_0 - \Delta_1 \cdot \frac{F_0}{F}$$

if $|\Delta_1| > e$, substituting a calculation result into the load function $F = f(x, K)$, calculating an update position point $x_1$, starting the servo motor 15, rapidly finely adjusting the T-shaped sliding block 16 to the update position point $x_1$, then comparing the difference between the actual transverse load amplitude F and the target transverse load amplitude $F_0$ again, and repeating the above process until the difference between the actual transverse load amplitude F and the target transverse load amplitude $F_0$ is less than the allowable error value e, wherein a smaller allowable error value e indicates better load stability and accuracy, but too small allowable error value e may result in longer regulating time.

(6) Continuously monitoring the size of the actual transverse load amplitude F and repeating (5) after the actual transverse load amplitude F meets the requirement, i.e., the difference between the actual transverse load amplitude F and the target transverse load amplitude $F_0$ is less than the allowable error value e, due to the instability of the transverse load amplitude.

(7) Taking the update transverse load amplitude $F_1$ as a new target transverse load amplitude, and conducting steps (1)-(7) when the user inputs a new target transverse load amplitude $F_1$ and a new allowable error value e.

2. Torque Load Transmission Part

The torque load transmission part comprises a torque arm 25, a speed reducer support frame 26, a guide rail sliding block 27, a bearing outer sleeve 28, a torque eccentric coupling 29, a speed reducer 30 and a torque servo motor 31; the speed reducer support frame 26 is fixed to a bottom plate 40; the torque servo motor 31 is externally connected with the speed reducer 30; an output shaft of the speed reducer 30 penetrates through the speed reducer support frame 26 and is fixed to the speed reducer support frame 26; the output shaft of the speed reducer 30 is connected with the torque eccentric coupling 29; the torque eccentric coupling 29 is fixed together with the upper end surface of the bearing outer sleeve 28; the lower end surface of the bearing outer sleeve 28 is fixed to a sliding block of the guide rail sliding block 27; a guide rail of the guide rail sliding block 27 is fixed to the torque arm 25; and one end of the torque arm 25 provided with a hexagon socket head is sleeved above a tensile plate 24 on an outer hexagon of a thick plank 33.

3. Axial Load Transmission Part

The axial load transmission part comprises a thin specimen 32, the thick plank 33, a specimen bolt 34, a bearing cap 35, a thrust ball bearing 36, an upper clamping plate 37, an axial load support frame 38 and a hydraulic rama 39; ends of the thin specimen 32 and the thick plank 33 are correspondingly assembled together; the upper end of the thick plank 33 and a right circular hole of the tensile plate 24 are assembled together, and the tail end of the thick plank 33 is installed in an inner ring of the upper clamping plate 37; the bearing cap 35 penetrates through the upper clamping plate 37, and clamps the thrust ball bearing 36 between the bearing cap 35 and the upper clamping plate 37; and one end of an oil hydraulic starting lever of the hydraulic rama 39 is placed in a cylinder on the axial load support frame 38, and a grappling hook on the oil hydraulic starting lever grapples the edge of the bearing cap 35.

4. Transverse Load Transmission Part

The transverse load transmission part comprises a spindle motor 1, a spindle motor output shaft flange 2, a square shaft flange 3, a square shaft 4, a first square shaft bushing 5, a crankshaft bearing 6, an eccentric rocker 7, a rocker connecting pin 17, a rocker connecting block 18, a U-shaped connecting rod 19, a first straight bearing 20, an elastic rod 21, a force sensor 22, a second straight bearing 23, a tensile plate 24 and a bottom plate 40; the spindle motor 1 is fixed to the bottom plate 40; an output shaft of the spindle motor 1 is connected with the square shaft 4 through the spindle motor output shaft flange 2 and the square shaft flange 3; the square shaft 4 drives the crankshaft bearing 6 through the first square shaft bushing 5 to rotate; the crankshaft bearing 6 transmits the motion to the eccentric rocker 7, and the eccentric rocker 7 is connected with the rocker connecting block 18 through the rocker connecting pin 17; the U-shaped connecting rod 19 is fixed to the rocker connecting block 18, and penetrates through the first straight bearing 20 to connect with the elastic rod 21; the elastic rod 21 is connected with the force sensor 22; and a transverse load is transmitted to the tensile plate 24 through the second straight bearing 23.

The invention claimed is:

1. A closed loop control method for transverse load amplitude of multiple bolt loosing tester, wherein the closed loop control method for transverse load amplitude of multiple bolt loosing tester is used to conduct stepless amplitude modulation and accurate control for transverse loads of the multiple bolt loosing tester, analyzing a signal collected by a force sensor, then conducting calculation through a PLC control system and finally issuing an instruction to a motor control system for controlling the rotation of the motor, thereby realizing stepless amplitude modulation and accurate control for the transverse loads;

the closed loop control method is realized based on the multiple bolt loosing tester; the multiple bolt loosing tester consists of four parts: a transverse load amplitude control part, a transverse load transmission part, a torque load transmission part and an axial load transmission part;

the torque load transmission part comprises a torque arm (25), a speed reducer support frame (26), a guide rail sliding block (27), a bearing outer sleeve (28), a torque eccentric coupling (29), a speed reducer (30) and a torque servo motor (31); the speed reducer support frame (26) is fixed to a bottom plate (40); the torque servo motor (31) is externally connected with the speed reducer (30); an output shaft of the speed reducer (30) penetrates through the speed reducer support frame (26) and is fixed to the speed reducer support frame (26); the output shaft of the speed reducer (30) is connected with the torque eccentric coupling (29); the torque eccentric coupling (29) is fixed together with the upper end surface of the bearing outer sleeve (28); the lower end surface of the bearing outer sleeve (28) is fixed to a sliding block of the guide rail sliding block (27); a guide rail of the guide rail sliding block (27) is fixed to the torque arm (25); one end of the torque arm

(25) provided with a hexagon socket head, which is located above a tensile plate (24), is sleeved on an outer hexagon of a thick plank (33);

the axial load transmission part comprises a thin plank (32), the thick plank (33), a specimen bolt (34), a bearing cap (35), a thrust ball bearing (36), an upper clamping plate (37), an axial load support frame (38) and a hydraulic rama (39); ends of the thin plank (32) and the thick plank (33) are correspondingly assembled together; the upper end of the thick plank (33) and a right circular hole of the tensile plate (24) are assembled together, and the tail end of the thick plank (33) is installed in an inner ring of the upper clamping plate (37); the bearing cap (35) penetrates through the upper clamping plate (37), and clamps the thrust ball bearing (36) between the bearing cap (35) and the upper clamping plate (37); one end of an oil hydraulic starting lever of the hydraulic rama (39) is placed in a cylinder on the axial load support frame (38), and a grappling hook on the oil hydraulic starting lever grapples the edge of the bearing cap (35);

the transverse load amplitude control part comprises a second square shaft bushing (8), a square shaft bearing (9), a transverse load guide rail moving plate (10), a transverse load guide rail fixed base plate (11), a lead screw nut (12), a ballscrew (13), a servo motor coupling (14), a servo motor (15) and a T-shaped sliding block (16); the second square shaft bushing (8) is connected with the square shaft bearing (9); the square shaft bearing (9) is installed in the T-shaped sliding block (16) through interference fit; the T-shaped sliding block (16) is installed on the transverse load guide rail moving plate (10), and moves together with the transverse load guide rail moving plate (10); the transverse load guide rail moving plate (10) can slide on the transverse load guide rail fixed base plate (11), and the transverse load guide rail fixed base plate (11) is installed on the bottom plate (40); the T-shaped sliding block (16) is connected with the lead screw nut (12), and the lead screw nut (12) is matched with the ballscrew (13) and located below the square shaft bearing (9); the ballscrew (13) is connected with the servo motor (15) through the servo motor coupling (14), and the servo motor (15) is fixed to the bottom plate (40);

the transverse load transmission part comprises a spindle motor (1), a spindle motor output shaft flange (2), a square shaft flange (3), a square shaft (4), a first square shaft bushing (5), a crankshaft bearing (6), an eccentric rocker (7), a rocker connecting pin (17), a rocker connecting block (18), a U-shaped connecting rod (19), a first straight bearing (20), an elastic rod (21), the force sensor (22), a second straight bearing (23), a tensile plate (24) and a bottom plate (40); the spindle motor (1) is fixed to the bottom plate (40); an output shaft of the spindle motor (1) is connected with the square shaft (4) through the spindle motor output shaft flange (2) and the square shaft flange (3); the square shaft (4) drives the crankshaft bearing (6) through the first square shaft bushing (5) to rotate; the crankshaft bearing (6) transmits the motion to the eccentric rocker (7), and the eccentric rocker (7) is connected with the rocker connecting block (18) through the rocker connecting pin (17); the U-shaped connecting rod (19) is fixed to the rocker connecting block (18), and penetrates through the first straight bearing (20) to connect with the elastic rod (21); the elastic rod (21) is connected with the force sensor (22); and a transverse load is transmitted to the tensile plate (24) through the second straight bearing (23);

the closed loop control method for transverse load amplitude of multiple bolt loosing tester, wherein, comprises the following steps:

step a) reading in various test parameters inputted by a user, comprising thickness d of connected pieces, lubrication condition m among the connected pieces, number n of bolts, target transverse load amplitude $F_0$ and allowable error value e, wherein $m_1$ represents no lubrication, $m_2$ represents certain degree of lubrication and $m_3$ represents good lubrication;

step b) automatically substituting the test parameters in step a) into a correction function K=g(d, m, n) by the system, calculating a correction coefficient K, and then automatically substituting the target transverse load amplitude $F_0$ and the correction coefficient K into a load function F=f(x, K) and calculating a target position point $x_0$ of the T-shaped sliding block (16), wherein x represents a position point of the T-shaped sliding block (16), and the correction function and the load function are stored in a tester controller;

step c) starting the servo motor (15), driving the T-shaped sliding block (16) by the ballscrew (13) through the lead screw nut (12) to move on the transverse load guide rail fixed base plate (11) together with the transverse load guide rail moving plate (10), and regulating the T-shaped sliding block (16) to the target position point $x_0$ to obtain an actual transverse load amplitude F close to the target transverse load amplitude $F_0$;

step d) enabling the spindle motor (1) to operate, and simultaneously enabling the force sensor (22) to monitor the size of the actual transverse load amplitude F in real time;

step e) calculating a difference $\Delta_1=F-F_0$ between the actual transverse load amplitude F and the target transverse load amplitude$F_0$, comparing a size relationship between a difference absolute value $|\Delta_1|$ and the allowable error value e, directly entering step f) if $|\Delta_1|\le e$, calculating an update transverse load amplitude $$F_1 = F_0 - \Delta_1 \cdot \frac{F_0}{F}$$

if $|\Delta_1|>e$, substituting a calculation result into the load function F=f(x, K), calculating an update position point $x_1$, starting the servo motor (15), rapidly finely adjusting the T-shaped sliding block (16) to the update position point $x_1$, then comparing the difference between the actual transverse load amplitude F and the target transverse load amplitude $F_0$ again, and repeating the above process until the difference between the actual transverse load amplitude F and the target transverse load amplitude $F_0$ is less than the allowable error value e;

step f) continuously monitoring the size of the actual transverse load amplitude F and repeating the step e) after the actual transverse load amplitude F meets the requirement, i.e., the difference between the actual transverse load amplitude F and the target transverse load amplitude $F_0$ is less than the allowable error value e, due to the instability of the transverse load amplitude;

step g) taking the update transverse load amplitude $F_1$, as a new target transverse load amplitude, and conducting step a) to step g) when the user inputs a new target transverse load amplitude $F_1$, and a new allowable error value e.

* * * * *